US007782807B2

(12) United States Patent
Yoon et al.

(10) Patent No.: US 7,782,807 B2
(45) Date of Patent: Aug. 24, 2010

(54) BROADCAST AND MULTICAST SERVICES (BCMCS) FOR ORTHOGONAL FREQUENCY DIVISION MULTIPLEXING (OFDM)-BASED MOBILE BROADBAND WIRELESS CELLULAR SYSTEMS

(75) Inventors: Young C. Yoon, San Diego, CA (US);
Li-Hsiang Sun, San Diego, CA (US);
Suk Woo Lee, San Diego, CA (US);
Sang G. Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 11/841,572

(22) Filed: Aug. 20, 2007

(65) Prior Publication Data
US 2008/0084818 A1    Apr. 10, 2008

Related U.S. Application Data

(60) Provisional application No. 60/822,909, filed on Aug. 18, 2006, provisional application No. 60/823,372, filed on Aug. 23, 2006, provisional application No. 60/824,766, filed on Sep. 6, 2006, provisional application No. 60/862,721, filed on Oct. 24, 2006.

(51) Int. Cl.
*H04H 20/71* (2008.01)
(52) U.S. Cl. .................. 370/312; 370/208; 370/252; 370/328

(58) Field of Classification Search .................. 370/252, 370/312, 328
See application file for complete search history.

(56) References Cited

U.S. PATENT DOCUMENTS

| 5,646,942 | A  | * | 7/1997  | Oliver et al. ............... 370/312 |
| 2003/0072254 | A1 | * | 4/2003 | Ma et al. .................... 370/208 |
| 2004/0165532 | A1 | * | 8/2004 | Poor et al. .................. 370/238 |
| 2005/0249142 | A1 | * | 11/2005 | Kim et al. ................... 370/312 |
| 2006/0018269 | A1 |   | 1/2006 | Agrawal et al. |
| 2006/0285483 | A1 | * | 12/2006 | Khan ......................... 370/208 |
| 2007/0104151 | A1 | * | 5/2007 | Papasakellariou et al. ... 370/335 |
| 2008/0025241 | A1 | * | 1/2008 | Bhushan et al. ............ 370/312 |

OTHER PUBLICATIONS

Minn, H., A Reduced Complexity Channel Estimation for OFDM Systems with Transmit Diversity in Mobile Wireless Channels, May 2002, IEEE Transactions on Communications, vol. 50, No. 5 pp. 799-807.*
Bakhuizen et al. "Mobile broadcast/multicast in mobile networks" Ericsson Review, 2005.
Annamalai M. "Multimedia Broadcast Multicast Service (MBMS) in GSM based Wireless Networks", T-Mobile USA, 2004.

\* cited by examiner

*Primary Examiner*—Huy D Vu
*Assistant Examiner*—Amy Haspel
(74) *Attorney, Agent, or Firm*—Lee, Hong, Degerman, Kang & Waimey

(57) ABSTRACT

Methods are provided for transmitting BCMCS in mobile broadband wireless cellular systems under development.

8 Claims, 15 Drawing Sheets

Zone-Based BCMCS

Zone-Based BCMCS

Clusters for Zone-based signaling in BCMCS

ATI- located in the center of a cluster
AT2- located at the edge of a cluster

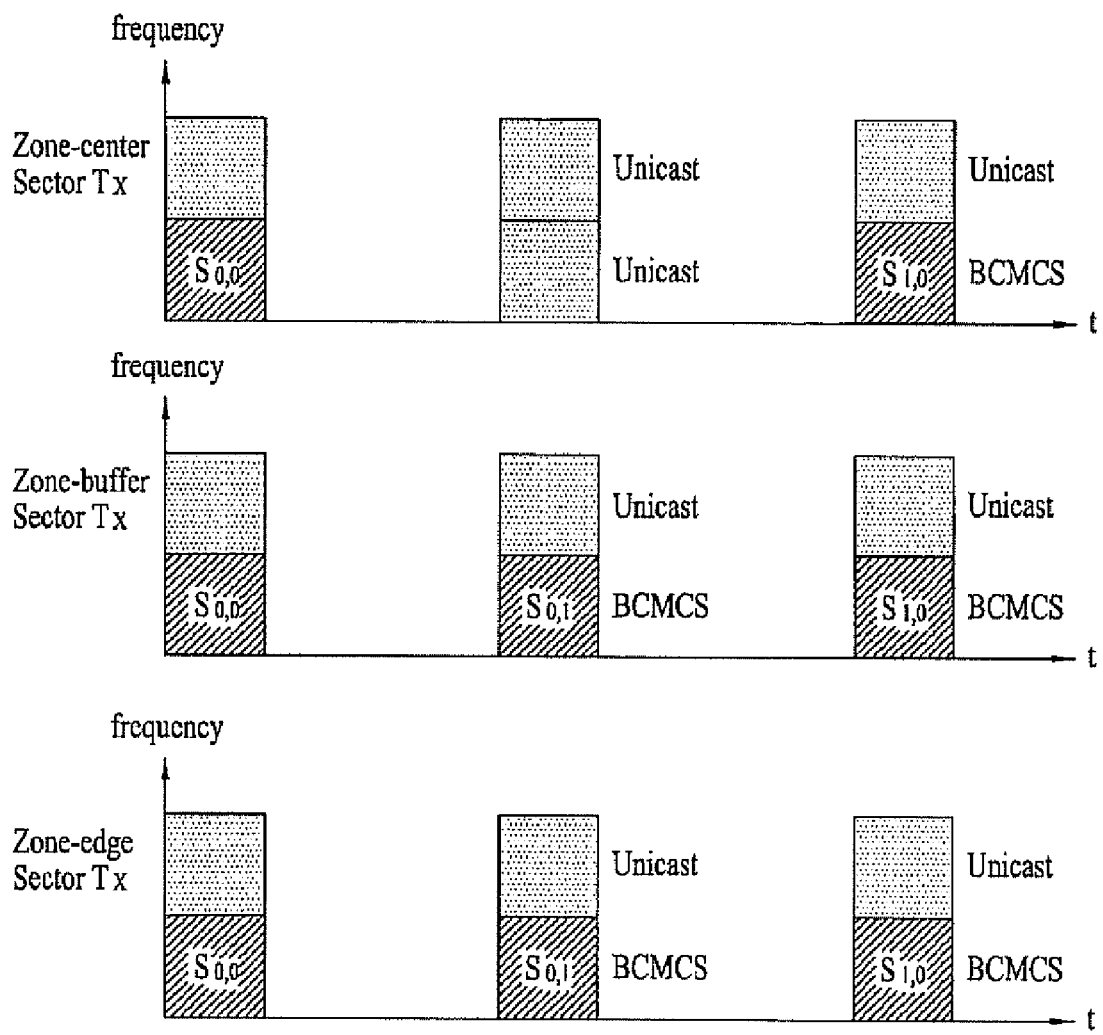

Variable BW resource allocate for zone-based signaling

Another example where more BW allocated to boundary BS for BCMCS

Zone-Based BCMCS sub-packet re-transmissions with larger granularity

Zone-Based BCMCS sub-packet re-transmissions with small granularity

Example of zones description
w/ center, buffer, and edge region

Exampe of 3-sector cell-site w/ FFR 1/3

FIG. 10

BCMCS with FFR 1/3
and unicast with FFR 1/3

|     | Sector Alpha | Sector Beta | Sector Gamma |
|-----|---|---|---|
| $f_1$ | BCMCS / F-SCCH / Unicast | Unused | Unused |
| $f_2$ | Unused | BCMCS / Unicast / F-SCCH | Unused |
| $f_3$ | Unused | Unused | BCMCS / Unicast / F-SCCH |

FIG. 11

BCMCS with universal frequency
reuse and unicast with FFR

|  | Sector Alpha | Sector Beta | Sector Gamma |
|---|---|---|---|
| $f_1$ | BCMCS | BCMCS | BCMCS |
|  | Unicast | Unused | Unused |
|  | F-SCCH | | |
| $f_2$ | BCMCS | BCMCS | BCMCS |
|  | Unused | Unicast | Unused |
|  | | F-SCCH | |
| $f_3$ | BCMCS | BCMCS | BCMCS |
|  | Unused | Unused | Unicast |
|  | | | F-SCCH |

F-CPICH Puncturing

BROADCAST AND MULTICAST SERVICES (BCMCS) FOR ORTHOGONAL FREQUENCY DIVISION MULTIPLEXING (OFDM)-BASED MOBILE BROADBAND WIRELESS CELLULAR SYSTEMS

CROSS-REFERENCE TO RELATED APPLICATIONS

Pursuant to 35 U.S.C.§120, this application claims the benefit of U.S. Provisional Application Ser. Nos. 60/822,909 filed on Aug. 18, 2006, 60/823,372 filed on Aug. 23, 2006, 60/824,766 filed on Sep. 6, 2006, and 60/862,721, filed on Oct. 24, 2006, the contents of which is hereby incorporated by reference herein in its entirety.

FIELD OF THE INVENTION

The present invention is directed to the design of Broadcast and Multicast Services (BCMCS) in mobile broadband wireless cellular systems under development.

DESCRIPTION OF THE RELATED ART

Broadcast and Multicast Services (BCMCS) is envisioned to carry broadcast or multicast content such as video and audio for mobile stations or access terminals (AT). Orthogonal Frequency Division Multiplexing (OFDM) is mainly used to transmit BCMCS data. In BCMCS, one or more basestations (BS) can transmit the same content.

A set of BSs collectively transmitting the same content is referred to as a cluster or zone such that a zone contains a set of cells broadcasting the same content. Broadcast content may differ from zone to zone.

If, for example, two adjacent zones use an overlapped set of time-frequency resources, then ATs in the boundary area between the two zones experience interference from the other BCMCS content. This is referred to as BCMCS-to-BCMCS interference.

If, however, the two zones do not use synchronized time-frequency resources for BCMCS, it is possible that ATs in the boundary area experience interference instead from unicast traffic. This is referred to as unicast-to-BCMCS interference.

It is important that BCMCS work well under zone-based scenarios where zones may have different content and, therefore, poorer coverage since ATs in the zone-boundary regions may experience poorer channel quality due to aforementioned interference. One example of poor channel quality is decreased signal-to-noise ratio (SNR). Ideally, coverage should be reasonably good and uniform no matter where an AT is in a zone or network. Moreover, BCMCS and unicast transmissions must operate and share time-frequency resources efficiently.

SUMMARY OF THE INVENTION

In one aspect of the present invention, a method of providing at least one broadcast and multicast service (BCMCS) and at least one unicast service in a wireless communications system is provided. The method includes providing a specific number of unicast symbols per frame at a specific clock rate, each of the specific number of unicast symbols including unicast data preceded by a cyclic prefix having a first specific length and providing a specific number of BCMCS symbols per frame at the specific clock rate, each of the specific number of BCMCS symbols including a specific number of BCMCS data chips preceded by a cyclic prefix having a second specific length greater than or equal to an anticipated delay, wherein a number of unicast chips provided per frame is equal to a number of BCMCS chips provided per frame, the number of BCMCS symbols per frame is an even number, and the specific number of data chips per BCMCS symbol is a factor of 2, 3, 5 or 7.

It is contemplated that the specific number of unicast symbols per frame is 8, the specific clock rate is 4.9152 MHz and the number of unicast chips provided per frame is 4480. It is further contemplated that the specific number of BCMCS symbols per frame is 2, 4, 6 or 8.

It is contemplated that the number of BCMCS symbols per frame and the specific number of BCMCS chips per symbol are according to a specific table. It is further contemplated that the system has clock rate 'x' MHz and the number of chips per OFDM symbol, N_FFT size, the number chips of CP plus window, and the number of chips of CP scale with a factor of x/4.9152.

In another aspect of the present invention, a method of providing at least one broadcast and multicast service (BCMCS) and at least one unicast service in a wireless communications system is provided. The method includes providing a specific number of unicast symbols per frame at a specific clock rate, each of the specific number of unicast symbols including unicast data preceded by a cyclic prefix having a first specific length and providing a specific number of BCMCS symbols per frame at the specific clock rate, each of the specific number of BCMCS symbols including BCMCS data preceded by a cyclic prefix having a second specific length, wherein the specific number of unicast symbols provided per frame is equal to the specific number of BCMCS symbols provided per frame and the first specific length is equal to the second specific length.

It is contemplated that the specific number of unicast symbols per frame is 8 and the specific clock rate is 4.9152 MHz. It is further contemplated that no guard tones are provided between unicast tones and BCMCS tones.

In another aspect of the present invention, a method of providing at least one broadcast and multicast service (BCMCS) and at least one unicast service in a wireless communications system is provided. The method includes providing the at least one unicast service using a first symbol design, the first symbol design including a first specific number of symbols per frame at a specific clock rate, each of the first specific number of symbols including unicast data preceded by a cyclic prefix having a first specific length and providing the at least one BCMCS at the specific clock rate as a plurality of sub packets, all but the last of the plurality of sub packets transmitted at a first power level using a second symbol design, the second symbol design including a second specific number of BCMCS symbols per frame with each of the second specific number of BCMCS symbols including BCMCS data preceded by a cyclic prefix having a second specific length and the last of the plurality of sub packets transmitted at a second power level using the first symbol design, wherein the second power level is greater than the first power level, the second specific number of BCMCS symbols per frame is less than or equal to the first specific number, and the second specific length is greater than the first specific length.

It is contemplated that the first specific number of unicast symbols per frame is 8 and the specific clock rate is 4.9152 MHz. It is further contemplated that no guard tones are provided between unicast tones and BCMCS tones for the last of the plurality of BCMCS sub packets.

In another aspect of the present invention, a method of providing a plurality of broadcast and multicast services (BCMCS) in a wireless communications system is provided. The method includes providing a first of the plurality of BCMCS from a first plurality of transmitters in a first zone, the first of the plurality of BCMCS including a first plurality of sub packets and providing a second of the plurality of BCMCS from a plurality of transmitters in a second zone, the second of the plurality of BCMCS including a second plurality of sub packets, wherein at least one of the first plurality of transmitters transmits the first plurality of sub packets multiple times according to a proximity to the second zone and at least one of the second plurality of transmitters transmits the second plurality of sub packets multiple times according to a proximity to the first zone.

It is contemplated that the at least one of the first plurality of transmitters transmits the first plurality of sub packets multiple times with a delay between each of the consecutive transmissions and the at least one of the second plurality of transmitters transmits the second plurality of sub packets multiple times with a delay between each of the consecutive transmissions. It is further contemplated that the at least one of the first plurality of transmitters transmits the first plurality of sub packets multiple times concurrently and the at least one of the second plurality of transmitters transmits the second plurality of sub packets multiple times concurrently. Preferably, It is contemplated that at least one of the first plurality of transmitters transmits the first plurality of sub packets in a first frequency band and the at least one of the second plurality of transmitters transmits the second plurality of sub packets in a second frequency band, the first frequency band separate from the second frequency band. It is further contemplated that the first plurality of transmitters are located in an edge region of the first zone and the at least one of the second plurality of transmitters are located in an edge region of the second zone.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3b illustrates an example of zone-based BCMCS in the time domain.

FIG. 10 illustrates BCMCS with FFR ⅓ and unicast with FFR ⅓.

FIG. 11 illustrates BCMCS with Universal Frequency Reuse and unicast with FFR.

DETAILED DESCRIPTION OF THE PREFERRED EMBODIMENTS

Reference will now be made in detail to the preferred embodiments of the present invention, examples of which are illustrated in the accompanying drawings. Although the present invention is applicable to 1xEV-DO systems where, for example, the transmission power for unicast and BCMCS transmissions are at full and constant power, the present invention is also applicable in general to systems where the transmission power for unicast transmission may vary. Furthermore, although the invention is disclosed with respect to BCMCS-to-BCMCS interference, it is contemplated that the invention may also be applied to unicast-to-BCMCS interference.

Figure 1:
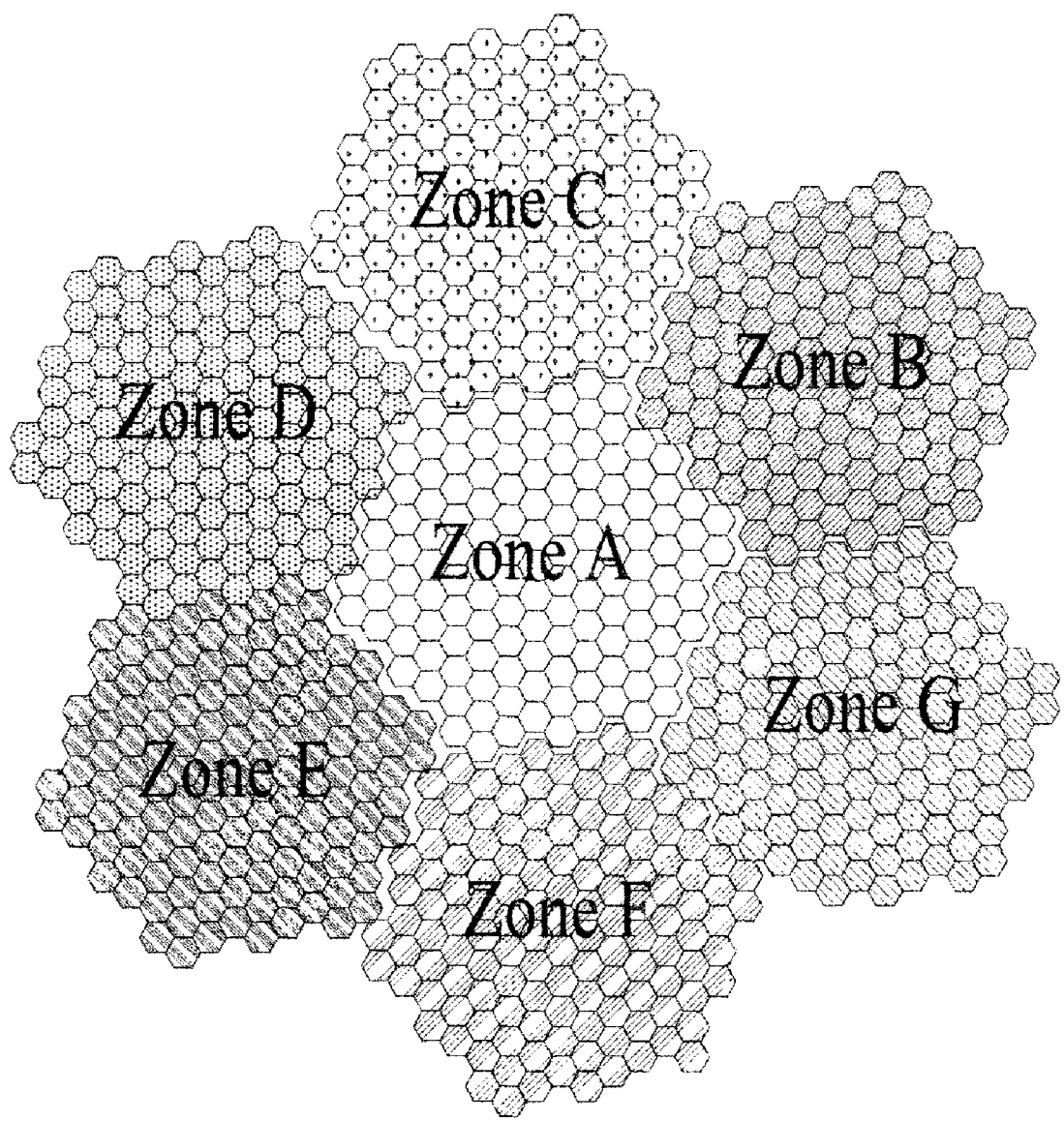
FIG. 1 illustrates a general zone based BCMCS scheme.
Figure 2:
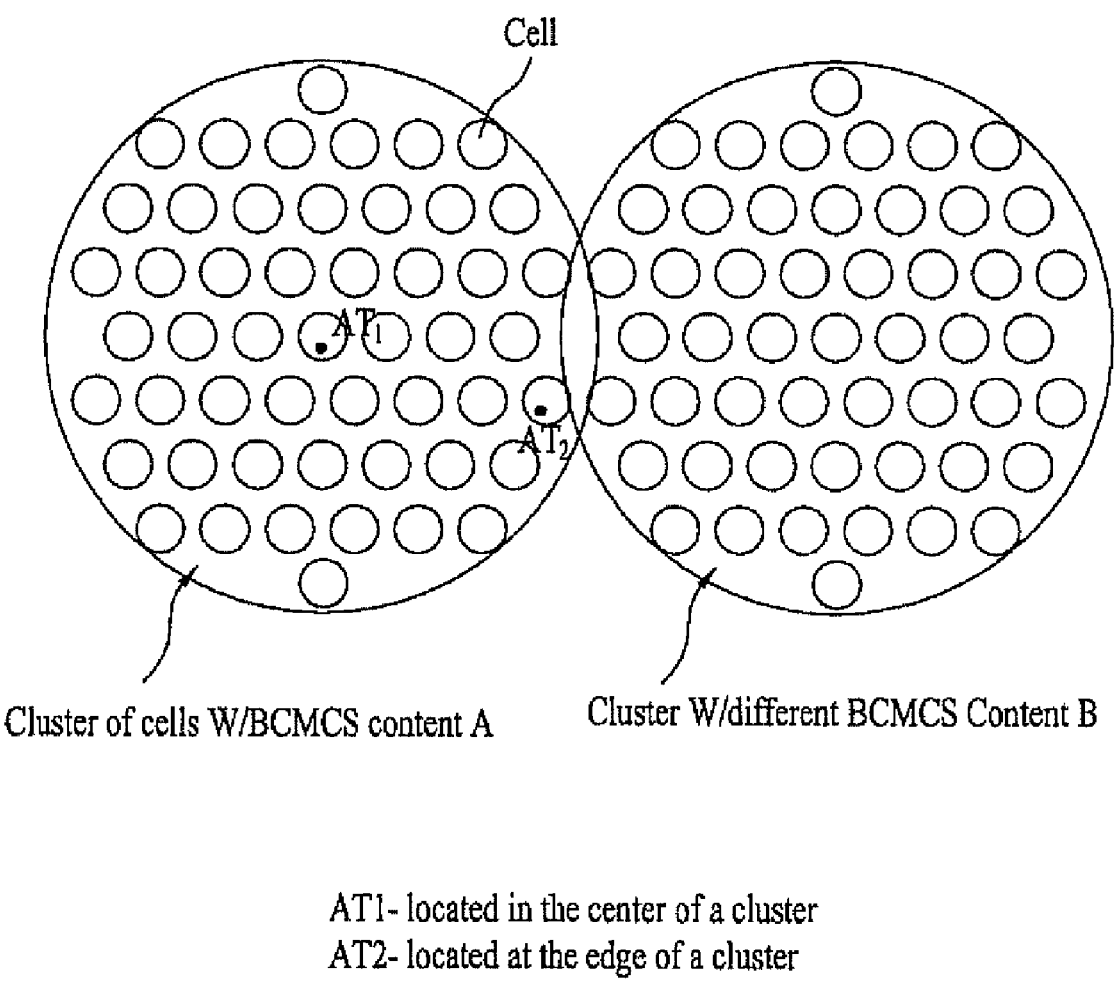
FIG. 2 illustrates clusters of cells for zone-based signals in BCMCS.

The present invention addresses zone based BCMCS signaling. FIG. 1 illustrates a general zone based BCMCS scheme. A generalized automatic re-transmission request (ARQ) scheme can be used for zone-based applications where clusters of cells may transmit different content, as illustrated in FIG. 2.

Those ATs located in the centre of a cluster tend to experience good channel quality due to the multi-site spatial diversity and soft-combining gains. However, those ATs located in the boundary regions between such clusters tend to experience poorer channel quality since signals from adjacent clusters with different content are a source of interference.

It is proposed to allow extra sub packet, or parity, transmissions for sectors at zone-edge regions in either the time domain and/or frequency domain, which can support higher rates. It is further proposed to allow extra sub packet transmissions to use the default unicast numerology such as 512 pt FFT of 5 MHz bandwidth defined in loosely backward compatible (LBC) mode or ultra mobile broadband (UMB) at zone-edges. This is because the benefit of large CP lengths and SFN gain is reduced due to adjacent-zone interference. Mixed unicast and BCMCS usage is allowed and guard tone overhead reduced.

Depending on the location of a sector in a zone, such as at zone-edge, each sub packet transmission is allowed to use a variable or fixed amount of channel resources. For example, further resources can be used for sectors closer to zone-edge. It is also proposed to allow for step-down of the modulation order as in UMB.

More generally, the amount of extra parity bits can be made gradually larger for sectors closer to the zone-edge. For example, the increased extra parity bits can be transmitted using more frequency resources in steps of sub-bands, such as 1.25 MHz or 625 kHz.

Sectors in the zone-center area use the minimum amount of resources for BCMCS, such as time, frequency, and/or power, and this can be configurable. The sectors in the zone-edge, such as those adjacent to other zones, can use the maximum amount of resources for BCMCS and this can be configurable. Since the zone-edge sectors need extra resources due to the greater interference from the adjacent zone, the amount of resources allocated to BCMCS can be made to grow gradually in steps of sub-band such as 1.25 MHz as the sectors move from the zone-center to the zone-edge.

Figure 3A:
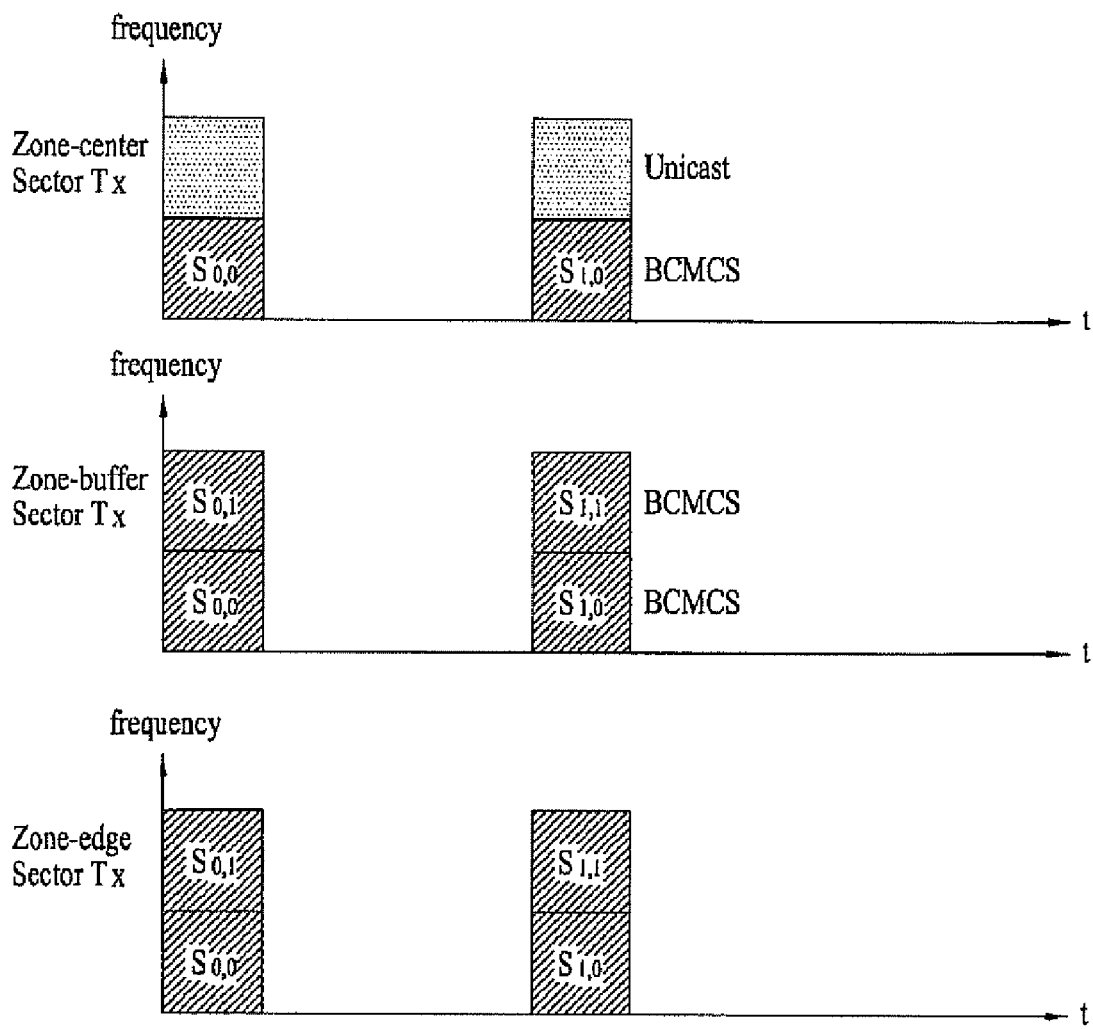
FIG. 3a illustrates an example of zone-based BCMCS in the frequency domain.
Figure 3C:
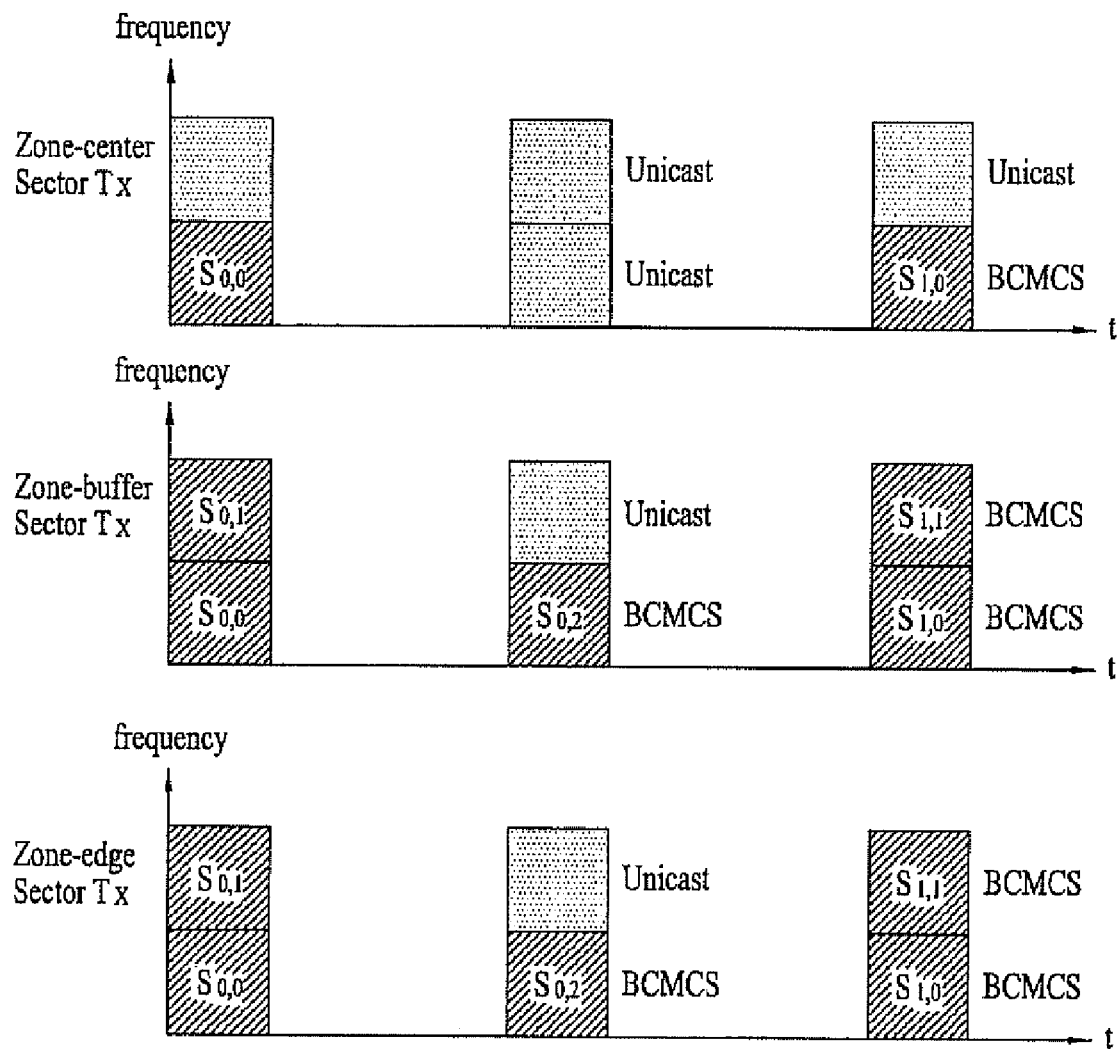
FIG. 3c illustrates an example of zone-based BCMCS in the both the frequency and time domains.

FIG. 3a illustrates an example of zone-based BCMCS in the frequency domain. FIG. 3b illustrates an example of zone-based BCMCS in the time domain. FIG. 3c illustrates an example of zone-based BCMCS in the both the frequency and time domains.

Figure 4A:
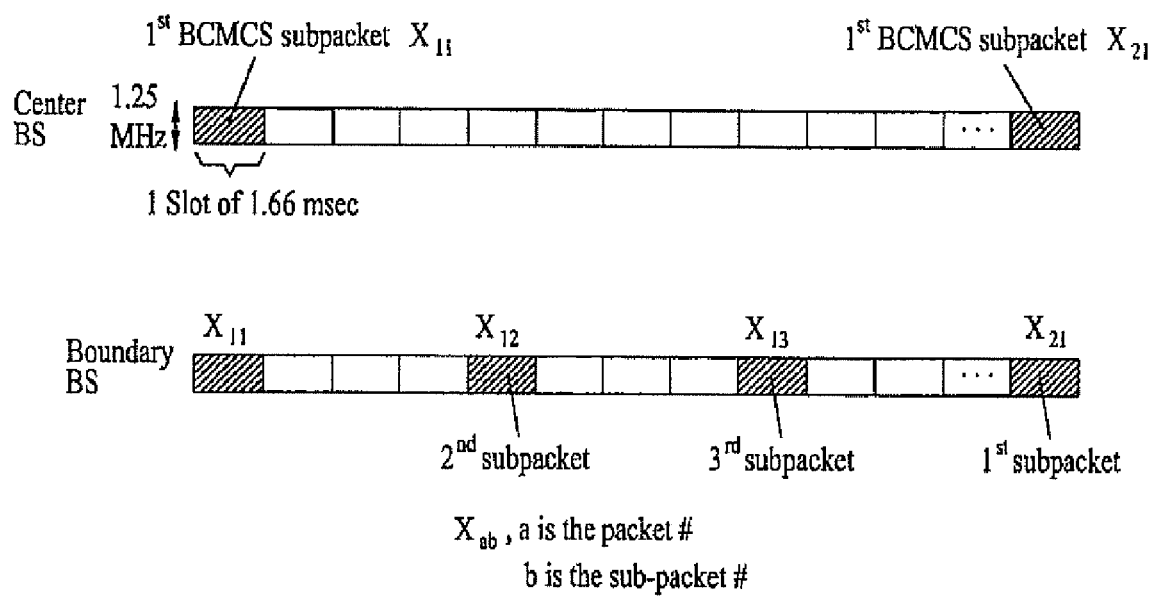
FIG. 4a illustrates 1xEV-DO Enhanced BCMCS.

FIG. 4a illustrates 1xEV-DO Enhanced BCMCS, where a transmission slot of length 1.66 msec and a bandwidth (BW) of 1.25 MHz is entirely reserved for BCMCS transmission. This allows for BS's in the boundary region to perform multiple and, therefore, more sub packet transmissions compared to BS's in the center or mid region of the cluster.

Figure 4B:
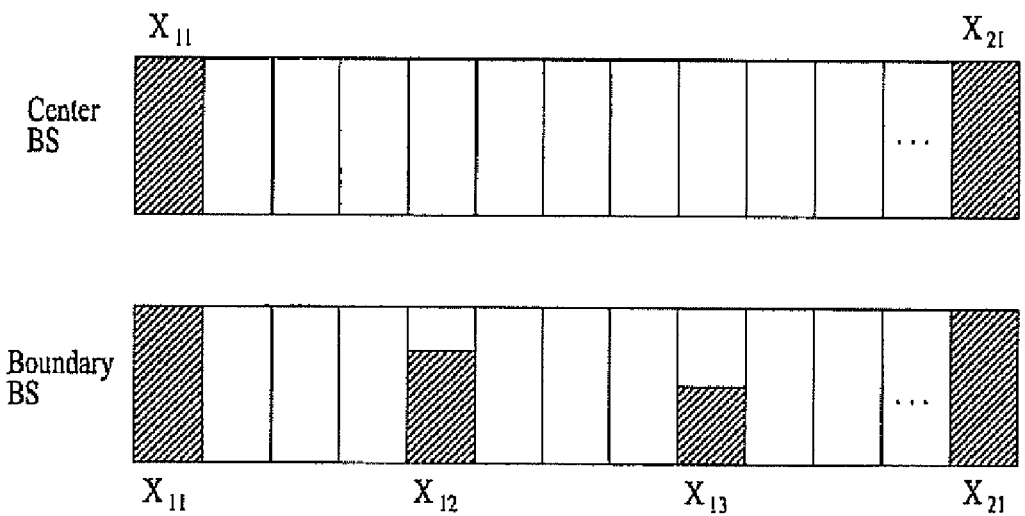
FIG. 4b illustrates a common first transmission for all BS's in a cluster.

The present invention generalizes support of variable bandwidths in each sub packet transmission given the possibility of bandwidth support much greater than 1.25 MHz. FIG. 4b illustrates a common first transmission for all BS's in a cluster. Those BS's at the boundary region can re-transmit a sub packet using a smaller, equal or greater amount of bandwidth resources.

In the case of fractional frequency re-use (FFR), such as ⅓, adjacent sectors may not necessarily be transmitting in common frequency bands or sub-bands. In this case, the subsequence re-transmissions need to maintain FFR and, therefore, the resources allocated must satisfy the FFR condition. In other words, re-transmissions can use a limited portion of the bandwidth as long as the FFR is maintained.

It is possible have partial overlap as well. In this case there is some single-frequency network (SFN) soft-combining gain occurring in the overlapped portions.

Re-transmitted sub packets in FFR can be identical or differently encoded and contain the same information. Each transmitted sub packet in FFR can be identical or differently encoded ones and contain the same information.

Figure 4C:
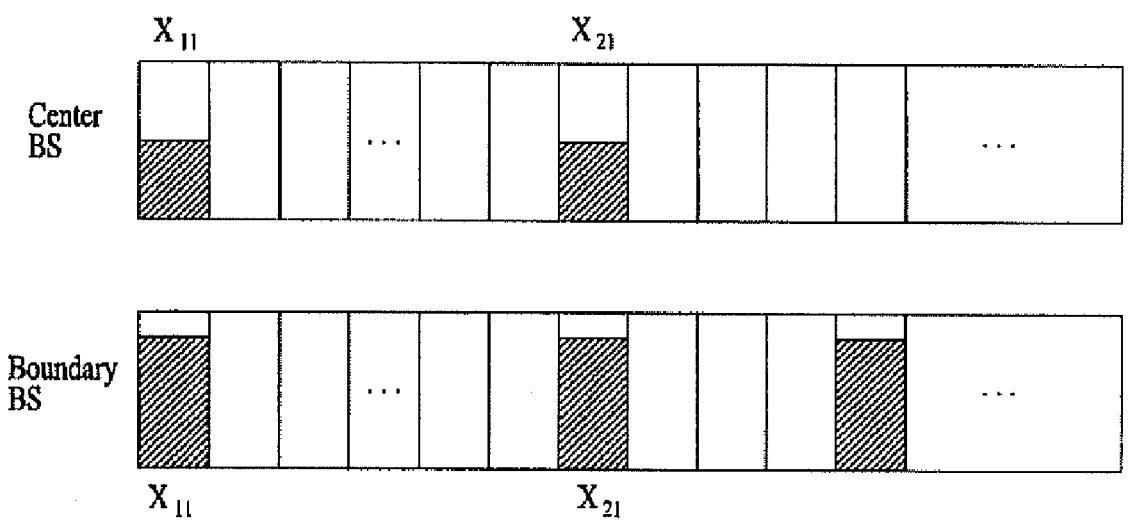
FIG. 4c illustrates allocating more bandwidth resources for boundary BS's for BCMCS transmissions.

FIG. 4c illustrates another option, which is to allocate more bandwidth resources for BCMCS transmissions at the boundary BS's. It is contemplated that many combinations allowing for variable bandwidth and variable time, or sub packet, resource allocations can be applied.

As disclosed earlier, the additional sub packet transmissions can use a different amount of channel resources, such as time, frequency and/or power. Consequently, the number of encoded bits sent in each sub packet can change as well according to the amount of time-frequency resources allocated to each BCMCS sub packet.

Figure 5:
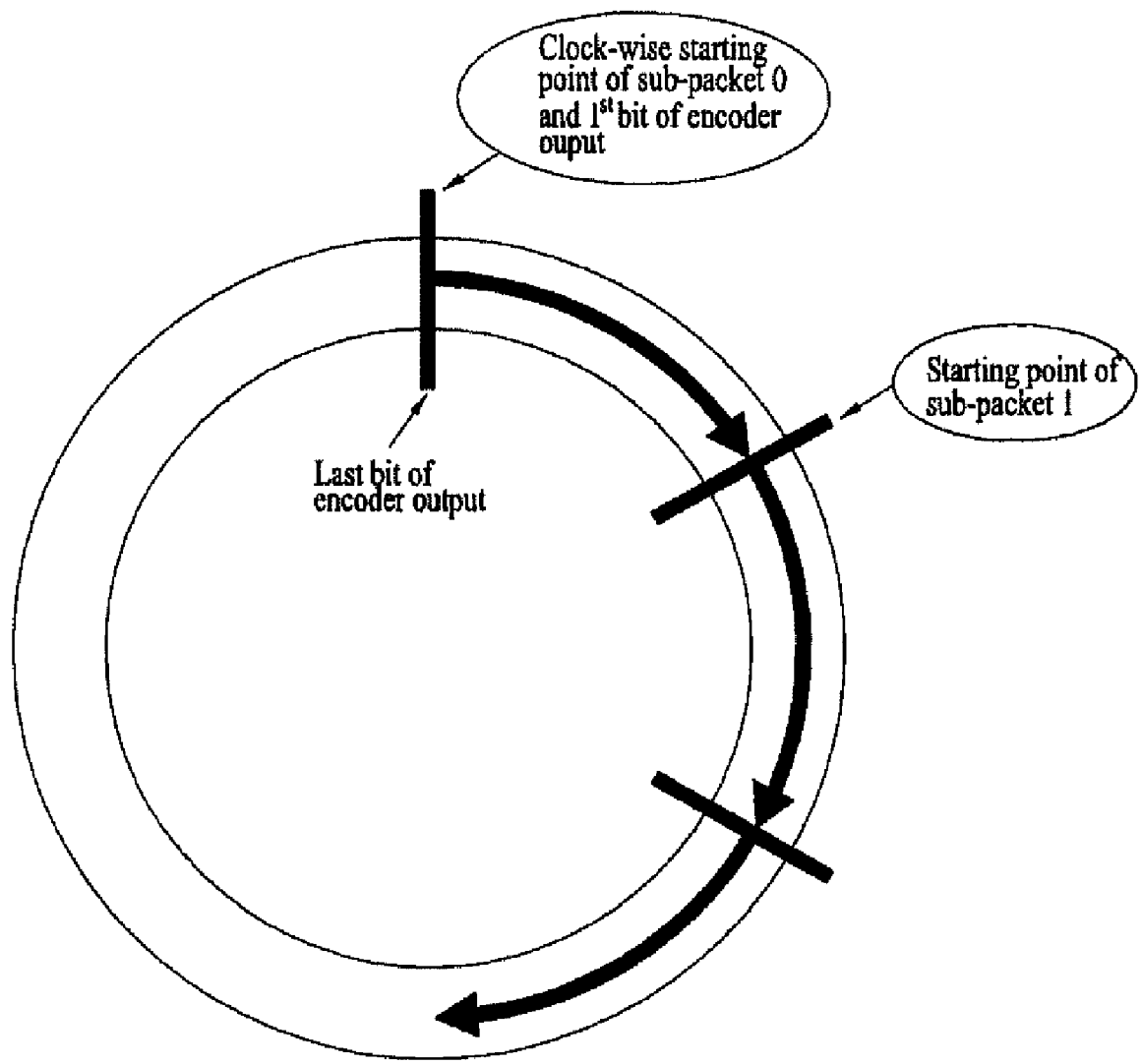
FIG. 5 illustrates a typical approach to zone-based BCMCS sub packet re-transmissions.
Figure 6:
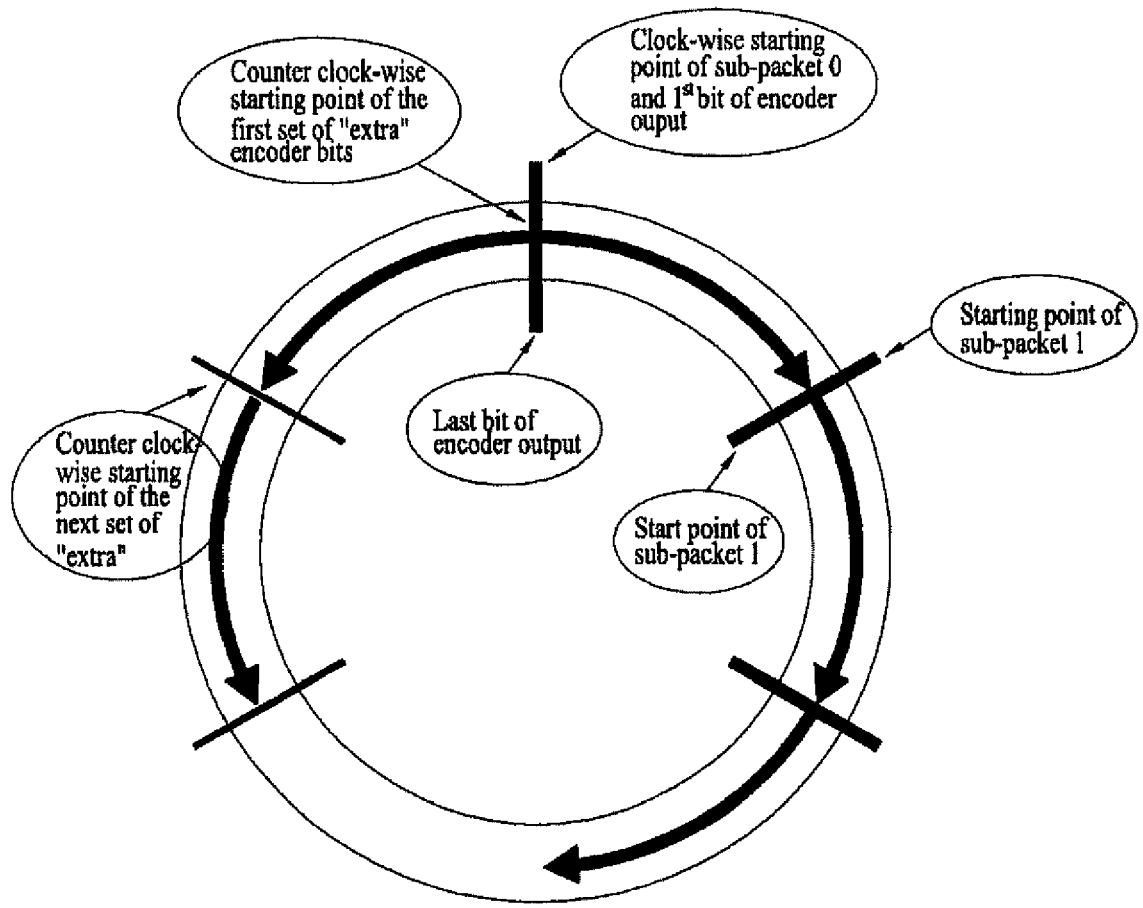
FIG. 6 illustrates zone-based BCMCS sub packet re-transmissions with larger granularity.
Figure 7:
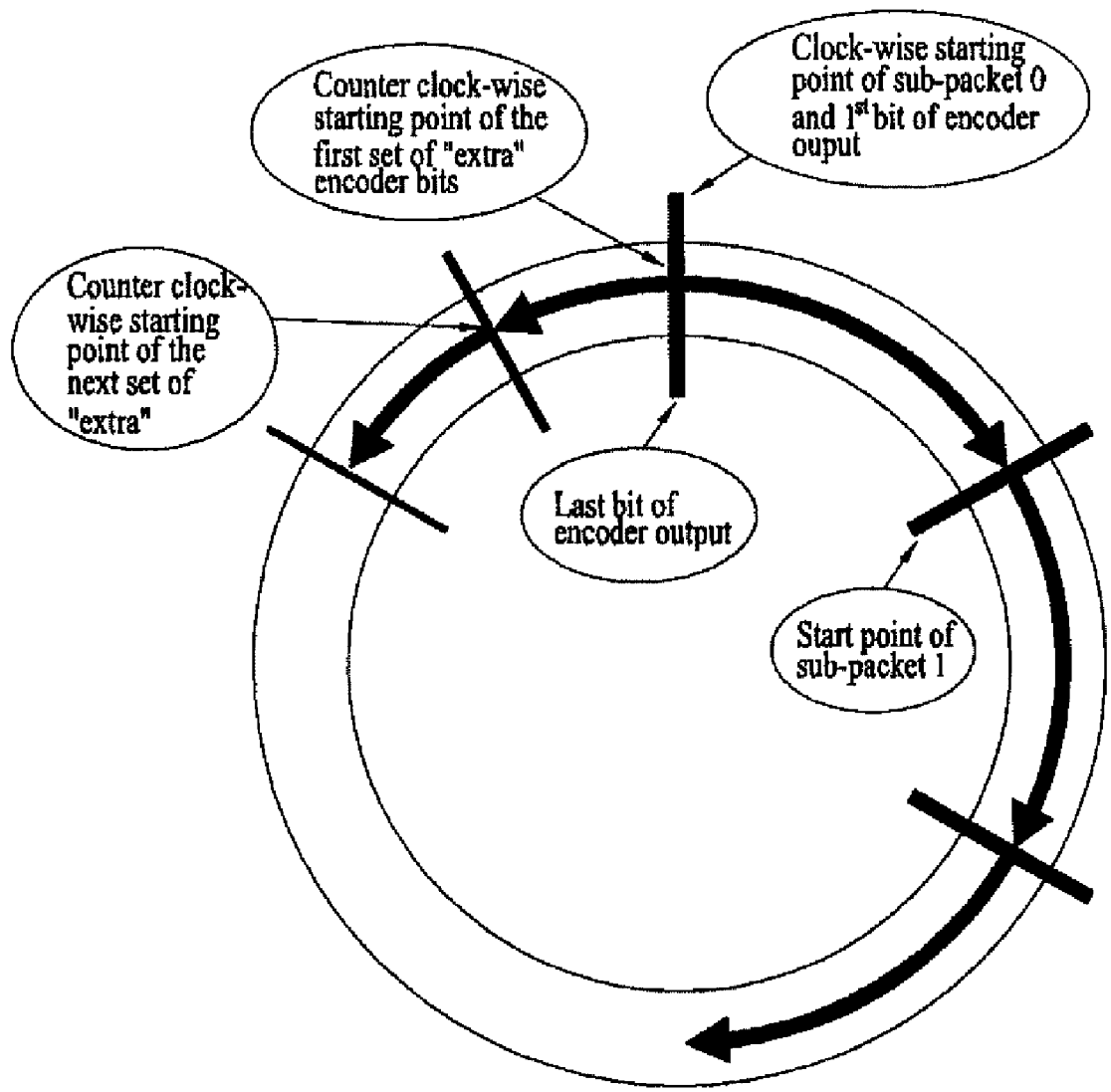
FIG. 7 illustrates zone-based BCMCS sub packet re-transmissions with small granularity.

The typical approach is to generate the encoder packets in a linear fashion by gathering a subset of encoded bits from the full set of encoded bits, as illustrated in FIG. 5. An alternative is to send extra incremental encoder bits starting instead from the end, as illustrated in FIG. 6. Furthermore, the granularity of additional encoder bits can be smaller, as illustrated in FIG. 7. Moreover, the extra encoder bits in FIGS. 6 and 7 could also be added to the encoder output bits in a clock-wise fashion as illustrated.

Present designs have an odd number of OFDM symbols per frame. Such designs do not support space-time block codes that require an even number of symbols.

Furthermore, there are limited cyclic prefix (CP) length options of roughly 22 and 40 microseconds. Deployments requiring other CP lengths, such as longer or shorter CP lengths, may exist. For example, CP lengths of 13 microseconds or 16 chips, 65 microseconds or 80 chips, and 32.6 microseconds or 40 chips exist in Enhanced BCMCS for 1xEV-DO.

It is proposed to include numerologies with an even number of OFDM symbols per frame. This allows support of open loop MIMO techniques, such as STBC encoded over two consecutive symbols in the time domain or spatial multiplexing.

Specifically, numerologies with 4, 6 or 8 OFDM symbols per frame are proposed. The numerologies, presented in terms of general and detailed features, support varying degrees of requirements related to the mobility of each AT and delay spread of the channels of each AT.

The number of symbols per frame (N_spf) can vary anywhere from 1 to N. For example, the number can range from 1 to 8. The larger the number, the greater the overhead due to CP. The smaller the number, the greater the susceptibility to performance degradation due to higher speeds (Doppler spread).

N_spf is designed to accommodate STBC. For example, for two-antenna Alamouti encoding, N_spf is set to a multiple of two. The OFDM symbol duration, including the CP, window and useful OFDM portion, is equal to the number of chips per frame N_cpf, such as 4480, divided by the number of symbols N_spf. For example, for 4 symbols per frame, N_cpf/N_spf=4480/4=1120 chips per OFDM symbol (N_FFT).

The OFDM symbol chips N_cps is partitioned between the CP (N_CP), window length (N_W) and useful OFDM portion N_FFT. The number of chips in a useful OFDM symbol, N_FFT, is typically set to some integer multiple of 2, 3, 5 or other small prime numbers in order to minimize computational complexity. Ideally, N_FFT is set to 2 for FFT.

As an example, assume a 5 MHz bandwidth (BW), a sampling or chip rate of 4.9152 (4×1.2288) Mcps (F_s), a cyclic prefix length of 6.51 microseconds and, therefore, 4480 chips per frame (N_cpf) as described. It is contemplated that the present invention can be readily applied to other bandwidths, such as 1.25, 10, 15, 20 MHz, different sampling rates and different cyclic prefix lengths. Some proposed N_FFT numbers are listed in Table II for a 5 MHZ bandwidth.

Many other options exist using a base radix of 3 or 5 instead of 2. However, it is preferable to have a power of 2 since the N_FFT for unicast is 512 for potential re-use in BCMCS OFDM symbol design. Table I illustrates proposed N_FFT numbers.

TABLE I

Powers of 2: 128, 256, 512, 1024, 2048
Powers of 2 and a single 3: 192, 384, 768, 1536
Powers of 2 and a single 5: 320, 640, 1280
Powers of 2 and a single 7: 448, 896, 1792
Powers of 2 and two 3's: 288, 576, 1152
Powers of 2 and a single 3 and a single 5: 120, 240, 480, 960, 1920
Powers of 2 and two 5's: 200, 400, 800, 1600

It is proposed to re-use the unicast numerology for BCMCS. This proposal can be used for environments with small delay spread, such as indoors and requires no new additional complexity since the design is already available.

This allows flexible and efficient scheduling of resources for broadcast, multicast and/or unicast traffic and eliminates overhead from guard tones between sub-carriers using different numerologies within a symbol. The guard tones are needed to separate tones with different sub-carrier spacing and symbol start and/or end boundaries. Furthermore zone-based operation with partial bandwidth usage in sub packet re-transmissions is facilitated. Moreover, puncturing of forward link common pilot channel (F-CPICH) sub-carriers into the BCMCS channel resources to support full-band and sub-band reverse link channel quality indicator channel (R-CQICH) reporting is allowed.

The number chips for cyclic prefix (CP), N_CP, is set to a value typically larger than the delay spread of a BCMCS network with or without repeaters. For example, the CP length can be set to 65 microseconds, which amounts to roughly 320 chips given a chip rate of 4.1952 Mcps. For indoor applications, the delay spreads may be smaller.

The number of chips for the window, N_W, can vary from 0 upwards. The larger the number N_W, the faster the roll-off factor in the frequency domain.

The OFDM symbol design can be re-done for each valid CP length, which ranges from 6.51 microseconds to 26.04 microseconds, as illustrated in Table II. Given that the CP length can differ from 6.51 microseconds, the OFDM symbol design can be re-done for any CP length. For example, the number of chips per frame becomes N_cpf=5248 for a CP length of 26.042 microseconds, or 128 chips at 4.9152 Mcps. Table II illustrates examples of OFDM Symbol Designs for BCMCS in LBC.

As illustrated in Table II, BS's at the cluster boundaries can use unicast-type OFDM symbol designs, with smaller CP lengths, such as 6.51 microseconds. This would reduce the number of guard tones needed to separate the BCMCS and unicast transmissions each having different OFDM symbol designs. Furthermore, the value of larger CP diminishes and, therefore, the value of single frequency network (SFN) soft-combining gain diminishes at the cluster-edge due to the interference of the adjacent cluster w/different content. However, the power saved from reduced CP length can be allocated to the sub-carriers (or tones) for data transmission.

The present invention addresses sub packet transmissions independent of zone-based signaling. Sub packet transmissions can use variable resources of bandwidth, power and/or time and variable modulation order and variable coding rates.

TABLE II

| BCMCS OFDM Symbol Design | M (symbols per frame) | chips per OFDM symbol | N_FFT size | Sub-carrier spacing [kHz] | CP + Window chips | CP [chips] | CP [μs] |
|---|---|---|---|---|---|---|---|
| 7-512 | 7 | 640 | 512 | 9.6 | 128 | 112 | 22.7865 |
| 3-1280 (256*5) | 3 | 1493.33 | 1280 | 3.84 | 213.3 | 197.3 | 40.1476 |
| 2-1792 | 2 | 2240 | 1792 | 2.7429 | 448 | 432 | 87.8906 |
| 2-1920 | 2 | 2240 | 1920 | 2.56 | 320 | 304 | 61.849 |
| 2-2048 | 2 | 2240 | 2048 | 2.4 | 192 | 176 | 35.8073 |
| 3-1024 | 3 | 1493.33 | 1024 | 4.8 | 469.3 | 453.3 | 92.2309 |
| 4-640 | 4 | 1120 | 640 | 7.68 | 480 | 464 | 94.401 |
| 4-768 | 4 | 1120 | 768 | 6.4 | 352 | 336 | 68.3594 |
| 4-896 | 4 | 1120 | 896 | 5.4857 | 224 | 208 | 42.3177 |
| 4-1024 | 4 | 1120 | 1024 | 4.8 | 96 | 80 | 16.276 |
| 5-576 (64*3*3) | 5 | 896 | 576 | 8.5333 | 320 | 304 | 61.849 |
| 5-640 (128*5) | 5 | 896 | 640 | 7.68 | 256 | 240 | 48.8281 |
| 5-768 (256*3) | 5 | 896 | 768 | 6.4 | 128 | 112 | 22.7865 |
| 6-384 | 6 | 746.667 | 384 | 12.8 | 362.7 | 346.7 | 70.5295 |
| 6-400 | 6 | 746.667 | 400 | 12.288 | 346.7 | 330.7 | 67.2743 |
| 6-480 | 6 | 746.667 | 480 | 10.24 | 266.7 | 250.7 | 50.9983 |
| 6-512 | 6 | 746.667 | 512 | 9.6 | 234.7 | 218.7 | 44.4878 |
| 6-576 | 6 | 746.667 | 576 | 8.5333 | 170.7 | 154.7 | 31.467 |
| 6-640 | 6 | 746.667 | 640 | 7.68 | 106.7 | 90.67 | 18.4462 |
| 7-320 | 7 | 640 | 320 | 15.36 | 320 | 304 | 61.849 |
| 7-384 | 7 | 640 | 384 | 12.8 | 256 | 240 | 48.8281 |
| 7-512 | 7 | 640 | 512 | 9.6 | 128 | 112 | 22.7865 |
| 7-576 | 7 | 640 | 576 | 8.5333 | 64 | 48 | 9.76563 |
| 8-320 | 8 | 560 | 320 | 15.36 | 240 | 224 | 45.5729 |
| 8-384 | 8 | 560 | 384 | 12.8 | 176 | 160 | 32.5521 |
| 8-512 (re-use UMB) | 8 | 560 | 512 | 9.6 | 48 | 32 | 6.51042 |

16 chips of window are applied to an OFDM symbol to reduce out-of-band interference.

The present invention addresses synchronized BSs and resource utilization. All BS's transmitting the same BCMCS content must be time and bandwidth synchronized.

In the case of fractional frequency re-use (FFR) where each sector may transmit over non-overlapping bandwidths, BS's can continue to transmit following the FFR pattern. The full bandwidth may be transmitted to maximize SFN soft-combining gain and increase coverage or somewhere between the two extremes.

When the same FFR pattern for BCMCS is used, the BCMCS pilots could be used for channel quality indication (CQI) estimation that is typically fed-back to the BS for scheduling and power control purposes. When the bandwidth utilization differs, the interference level differs and CQI estimated during BCMCS transmissions may be off. In this case, the ATs must be informed of the timing and bandwidth, or tones, where BCMCS is occurring so that the CQI can be disabled during that time.

Furthermore, it may be preferable to separate the BCMCS frames as much as possible to allow for reasonable CQI estimation for non-BCMCS purposes, such as scheduling of unicast traffic and power control. Moreover, the control channel, such as a shared control channel (SCCH), can be sent with FFR since it is based on the CQI The present invention addresses shared BCMCS and unicast signaling. A particular frame can carry some combination of control information, unicast traffic, such as a forward data channel (F-DCH), and BCMCS traffic. The partitioning of the bandwidth resources can be signaled on a per-frame basis by the control signal (SCCH) or on a per super-frame basis by the preamble.

The present invention addresses zone-based operation in FFR. All the sectors except those in the boundary region, or zone-edge, may transmit using the full time-frequency resources or some smaller portion of the resources but a portion greater than that allocated in the FFR case.

For example, in the ⅓ FFR case with three sectors per cell-site, each sector of a cell may use ⅓ of the bandwidth resources for unicast transmissions. For BCMCS transmissions only, the full set of resources, such as 1/1 FFR or some FFR value between ⅓ and 1, can be used. This same idea can be applied to a specific ARQ time or interlace.

Figure 8:
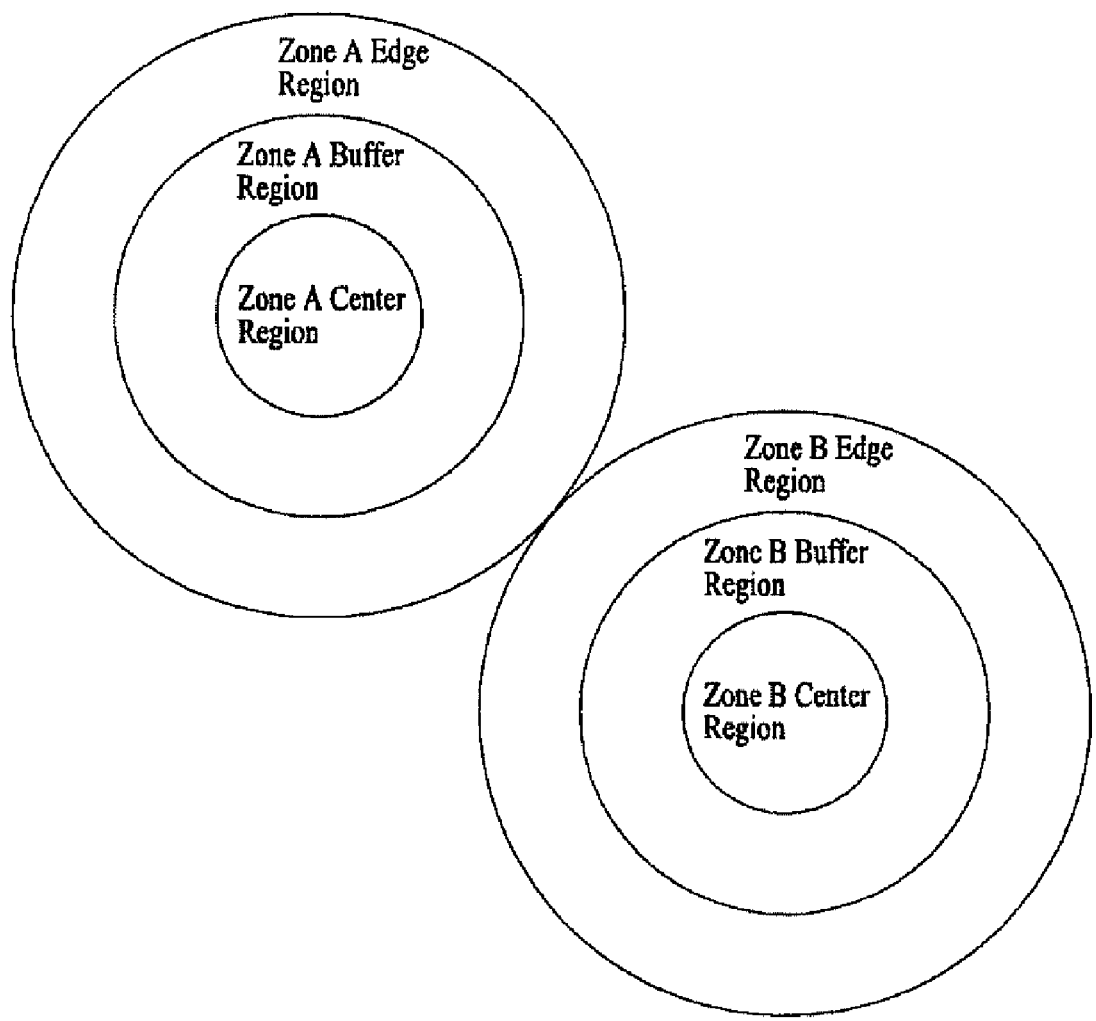
FIG. 8 illustrates 3-tier BCMCS zones.

FIG. 8 illustrates 3-tier BCMCS zones. It is important that this FFR extension concept not be applied to the zone-edge cells, such as Zone A in FIG. 8, if the adjacent zone, such as Zone B in FIG. 8, does not use BCMCS in the same time-frequency resources as that of Zone A.

For example, Zone B in FIG. 8 may not have BCMCS on and may be supporting unicast data transmissions only. In this case, the zone-edge cells of Zone A in FIG. 8 can transmit over additional time-frequency resources by using sub packet transmissions in the same or different ARQ interlace(s).

It is also proposed that extra sub-bands be used for more SFN gain at the boundary regions. Furthermore, code combining soft-handoff (CCSH) is also proposed.

It is possible to have BCMCS and SFN across the full 5 MHz for cells located in the center of a zone, such as Zone A in FIG. 8, all the way close to the cell-edge. The center cells enjoy not only SFN gain but also three times the bandwidth.

The full BW usage must stop to maintain FFR for the adjacent Zone B assuming it uses FFR, such as in unicast case where there is no BCMCS in Zone B. The BS's at the cell-edge in the FFR region or boundary region must use another dimension, such as re-transmission to increase the throughput.

The present invention addresses FFR with BCMCS. Universal frequency re-use, such as 1/1, or FFR, such as ⅓, of BCMCS sub-carriers is allowed during BCMCS frames.

F-SCCH sub-carriers remain in FFR. ATs requiring CQI estimation can skip BCMCS interlaces when estimating the CQI. BCMCS interlace selections are broadcast and can include adjacent zone information in zone-based operations. When the number of BCMCS interlaces exceeds a specific number, such as 3, and is less than the maximum number of interlaces, then full frequency re-use of BCMCS can be disabled.

One of the problems with using additional bandwidth, such as ⅓ to 1/1 FFR, for BCMCS is that the accuracy of CQI estimation needed from the common pilots or dedicated pilots for unicast transmission support, such as scheduling, adaptive modulation coding and power control of the FL channels, is worsened. This is because adjacent sectors can generate interference unlike unicast pilot transmissions, where is no interference from adjacent sectors, such as in ⅓ FFR, during a BCMCS transmission where the FFR factor is greater than ⅓.

This interference can be avoided by reserving those sub-carriers, or tones, used by common pilots such that no BCMCS signal can be sent over such reserved sub-carriers. This will work well when the BCMCS OFDM symbol design is identical to that for Unicast.

However, when the BCMCS and unicast OFDM symbol designs are different, such as for different sub-carrier spacing, guard tones would be needed. In other words, the unicast pilots can be punctured in the BCMCS time-frequency resources.

A preferable approach is to limit the number of interlaces for BCMCS and to place them as far apart as possible. For example, assuming six interlaces, the number of BCMCS interlaces could be restricted to two and spaced such that the sequence is 'B' 'U' 'U' 'B' 'U' 'U', where 'B' represents an interlace with BCMCS and 'U' represents an interlace with unicast.

An upper layer message, such as unicast, multicast or broadcast, must be transmitted to the AT indicating which resources, such as time, frequency and/or interlace, is being used by BCMCS. This is because ATs not using BCMCS, such as unicast ATs not capable of BCMCS and unicast ATs capable of BCMCS but using BCMCS, must know which interlaces, such as time-frequency resources, are being used for BCMCS.

Another approach is to use a special sub-band with a FFR factor of 1 across the entire zone or set of zones. The remaining sub-bands could then be used to support FFR.

A problem arises when one zone uses full frequency re-use or close to full frequency re-use and another zone does NOT have BCMCS and FFR is used in the network. In this case, the zone-edge BS's would cause interference with the ATs in the adjacent zone where FFR may be deployed if the zone-edge BS's use full frequency re-use for BCMCS.

One solution is to have the zone-edge BS's use FFR as well, for example, the same FFR, such as ⅓, as the adjacent zone BS's. Another solution is to have the BS's in the inner zone, such as the center or buffer zones where there is a third tier between the center zone and zone edge as illustrated in FIG. 8, use the entire frequency, for example, full or close to full frequency re-use, such as 1/1.

Another solution is for the zone-edge BS's to send the same sub packet on each sector or a differently encoded sub packet on each sector based on the same payload, with each sector sending over a different sub-band such as 1.25 MHz. The BS's in the center or buffer zones can follow the same sub packet transmission schemes.

However, these BS's can use full or close to full frequency re-use unlike the BS's in the zone-edge that uses FFR. If the FFR is dynamic, such that the time/frequency resource allocation changes with time, then the BCMCS resource allocations between the sub-bands can follow the FFR.

It is also proposed to do FFR of the common pilots by puncturing them into a full-band, or non-FFR, BCMCS. However guard tones would be needed in the case of different sub-carrier spacing.

This approach is applicable if the unicast OFDM symbols are re-used for BCMCS. If BCMCS reuses the unicast OFDM symbol numerology, then SFN can be performed for all sectors in unicast FFR by puncturing the SCCH and the common pilots.

Speed limits may be a function of the sub-carrier spacing due to Doppler. For example, for 3.8 kHz and 2 GHz, a 1% Doppler shift of 20 km/h, a 2% Doppler shift of 41 km/h, and a 5% Doppler shift of 102.6 km/h. Furthermore, for 9.6 kHz, a 2% Doppler shift of 104 km/h.

Even if BCMCS uses FFR but with a different sub-carrier spacing, the CQI for unicast traffic can still not be estimated properly. This is because the pilots are SFN, soft-combined. Ultimately, the AT must avoid the BCMCS interlace with or without FFR for unicast CQI estimation.

One solution is to use the fourth sub-band that may be universally re-used, or a factor of 1, for BCMCS. A sparse number of interlaces must be used for BCMCS such that most of the interlaces cannot be used for BCMCS. An AT not using BCMCS, such as a unicast AT not capable of BCMCS or a unicast AT capable of BCMCS but not using BCMCS, must know which interlaces, such as time-frequency resources, are being used for BCMCS.

The present invention addresses BCMCS operation with unicast. When BCMCS re-uses the existing LBC OFDM symbol numerology, partitioning the resources between the two traffic types allows mixing BCMCS and Unicast transmissions more efficiently. This is particularly useful in conjunction with zone-based BCMCS operation when the full BCMCS bandwidth is not needed at the zone-edge. In zone-based scenarios, for unicast traffic transmission is allowed in the unused BCMCS channel resources, such as interlaces and/or tiles, of zone-center locations.

BCMCS transmissions may be at a variable rate, thereby requiring a variable amount of time-frequency resources. Control signaling can be used to indicate the partitioning of the BCMCS and Unicast resources. The signaling can be done fast, such as on a frame-by-frame basis, or slow, such as on a super-frame basis. The control information could be sent over the shared control channel (SCCH) or the preamble.

A BCMCS MACID is also defined, having its own message over the SCCH and own PF and Channel Format. It is easier if the BCMCS and unicast use the same OFDM numerology.

Figure 9:
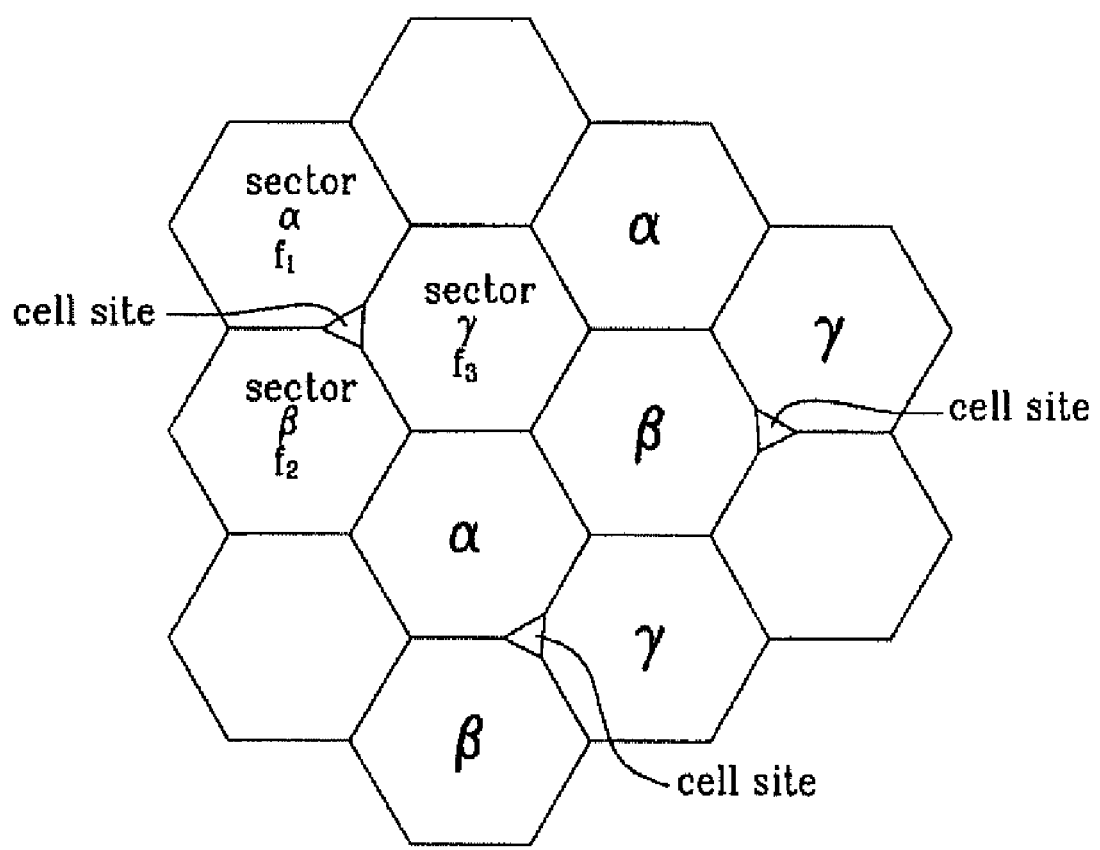
FIG. 9 illustrates three sector cell-sites.

The present invention addresses BCMCS operation with unicast and FFR. FIG. 9 illustrates three sector cell-sites. With this configuration, the BCMCS signals can be sent with full or universal frequency re-use 1/1 or FFR, such as 1/3 and the unicast signals and the F-SCCH can be sent using FFR, such as 1/3. Since the BCMCS signals can be sent one of two ways, there are two options envisioned.

FIG. 10 illustrates an example of a first option, specifically BCMCS with FFR 1/3 and unicast with FFR 1/3. The first option is useful at zone-edge sectors when an adjacent zone has, for example, only unicast traffic with FFR and no BCMCS. The first option allows reduction of interference to the adjacent zone compared to the universal frequency reuse case.

Sector alpha transmits only in sub-band 'f1'. Sector beta transmits only in sub-band 'f2'. Sector gamma transmits only in sub-band 'f3'.

The BCMCS coverage is weakened using the first option since, for example, there is no BCMCS signal in Sector beta in 'f1' and 'f3'. On the other hand, the first option may be needed when a sector is located in the edge-zone region, such as when the adjacent zone does not use BCMCS and uses FFR.

FIG. 11 illustrates an example of a second option, specifically BCMCS with universal frequency reuse and unicast w/FFR 1/3. The second option provides greater soft-combining gain and coverage.

Sector alpha transmits the BCMCS signal in a portion of each sub-band. Sectors beta and gamma also transmit the BCMCS signal in a portion of each sub-band. The BCMCS portion in each sub-band can be consistent across each row, but does not necessarily need be. For example, the BCMCS portion in 'f1' is consistent across sectors alpha, beta and gamma.

Regardless of the option chosen, it is important that the sectors in a zone be aware of those frequency sub-carriers that should be reserved in each sector, such as the unused regions illustrated in FIGS. 10 and 11. In other words, each sector is informed of which sub-carriers can be used as universal frequency re-use 1/1 for BCMCS.

The present invention addresses BCMCS common pilot design. The BCMCS common pilots F-BPICH pilot tone positions are set to be identical for each sector in a zone in order to enable soft-combining of data and pilot tones in channel resources reserved for BCMCS. This is in contrast to the conventional designs in which the pilot position in frequency domain is offset from one sector to another sector.

The pilot position in the frequency domain can be offset between zones. This allows for pilot boosting for improved channel estimation performance.

The present invention addresses BCMCS auxiliary pilot design. The forward link auxiliary BCMCS pilot channel (F-AuxBPICH) tone positions are set identical for each sector in a zone in order to enable soft-combining of data, F-BPICH, and F-AuxBPICH for MIMO support tones in channel resources reserved for BCMCS.

The F-AuxBPICH pilot positions in the frequency domain can be offset between zones. This allows for pilot boosting for improved channel estimation performance at zone boundary regions.

Generally, the density of BCMCS pilots, or the number of pilots in a certain bandwidth, grows with the size of the cyclic prefix (CP) length or multipath delay spread. Therefore, the BCMCS pilot density may change depending on the BCMCS OFDM symbol selection. Furthermore, each sub packet could have a different OFDM symbol and, therefore, a different pilot density and pilot pattern design in zone-based operations.

The present invention addresses common pilot and auxiliary common pilot design. The common pilot is used by ATs to measure full-band and sub-band channel quality information (CQI). The Auxiliary common pilot is used by ATs to measure MIMO related channel quality information to support MIMO.

An AT may need to avoid the time-frequency resources reserved for BCMCS when estimating the CQI for full-band, sub-band and MIMO CQICH reporting. This problem can be eliminated entirely when the BCMCS and unicast traffic share the same OFDM symbol numerology by inserting F-CPICH pilots into the BCMCS resources.

Figure 12:
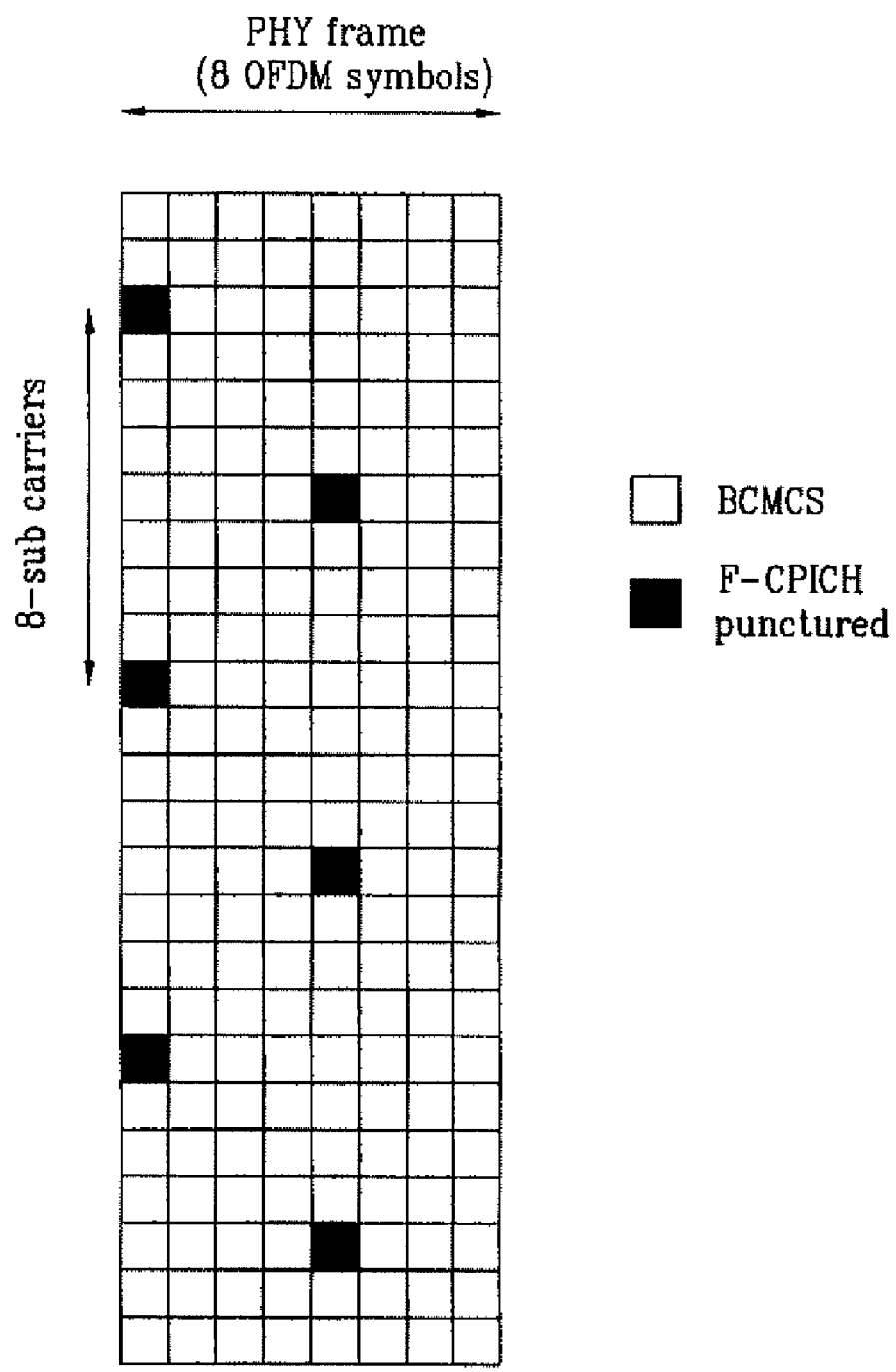
FIG. 12 illustrates F-CPICH puncturing.

This is achieved by inserting F-CPICH pilots into the BCMCS resources. Then ATs can estimate the CQI using the full F-CPICH. In contrast, ATs receiving BCMCS signals need to be aware of which resources are reserved for the F-CPICH pilots so that those ATs receiving BCMCS can avoid decoding those symbols reserved for the F-CPICH, or in other words, avoid decoding these signals reserved for non-BCMCS purposes. FIG. 12 illustrates F-CPICH puncturing.

In a similar fashion, the forward link auxiliary pilot channel (F-AuxPICH) can be punctured into the time-frequency resources reserved for BCMCS. This allows the ATs to measure CQI parameters needed to support MIMO. For example, more than one channel estimate is needed if there are two antennas. This is in contrast to the single antenna case. Furthermore, those ATs with BCMCS service would need to avoid those resources earmarked for F-AuxPICH.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting signals for providing broadcast and multicast service (BCMCS) in a wireless communications system, the method comprising:
   preparing a specific number of BCMCS symbols per frame at a specific clock rate, each of the specific number of BCMCS symbols comprising a specific number of BCMCS data chips preceded by a cyclic prefix having a specific length greater than or equal to an anticipated multi-path delay spread;
   performing space-time block coding (STBC) of the BCMCS data chips over two consecutive BCMCS symbols in a time domain per frame; and
   transmitting the BCMCS symbols using an open loop multi-input multi-output, (MIMO) technique,
   wherein the specific clock rate is 4.9152 MHz,
   wherein the number of BCMCS symbols per frame is 2,
   wherein the specific number of BCMCS data chips per symbol is 2240, and
   wherein N_FFT size, subcarrier spacing, the number chips of cyclic prefix plus window and the number of chips of cyclic prefix are configured according to one of:
   (1) N_FFT size: 1792, subcarrier spacing: 2.7429 kHz, the number chips of cyclic prefix plus window: 448, the number of chips of cyclic prefix: 432,
   (2) N_FFT size: 1920, subcarrier spacing: 2.56 kHz, the number chips of cyclic prefix plus window: 320, the number of chips of cyclic prefix: 304, and
   (3) N_FFT size: 2048, subcarrier spacing: 2.4 kHz, the number chips of cyclic prefix plus window: 192, the number of chips of cyclic prefix: 176.

2. The method of claim 1, wherein the system has clock rate 'x' MHz and the specific number of BCMCS data chips per symbol, N_FFT size, the number chips of cyclic prefix plus window, and the number of chips of cyclic prefix scale with a factor of x/4.9152.

3. A method of transmitting signals for providing broadcast and multicast service (BCMCS) in a wireless communications system, the method comprising:
   preparing a specific number of BCMCS symbols per frame at a specific clock rate, each of the specific number of BCMCS symbols comprising a specific number of BCMCS data chips preceded by a cyclic prefix having a specific length greater than or equal to an anticipated multi-path delay spread;
   performing space-time block coding (STBC) of the BCMCS data chips over two consecutive BCMCS symbols in a time domain per frame; and
   transmitting the BCMCS symbols using an open loop multi-input multi-output, (MIMO) technique,
   wherein the specific clock rate is 4.9152 MHz, the number of BCMCS symbols per frame is 4 and the specific number of BCMCS data chips per symbol is 1120, and
   wherein N_FFT size, subcarrier spacing, the number chips of cyclic prefix plus window and the number of chips of cyclic prefix are configured according to one of:
   (1) N_FFT size: 640, subcarrier spacing: 7.68 kHz, the number chips of cyclic prefix plus window: 480, the number of chips of cyclic prefix: 464,
   (2) N_FFT size: 768, subcarrier spacing: 6.4 kHz, the number chips of cyclic prefix plus window: 352, the number of chips of cyclic prefix: 336,
   (3) N_FFT size: 896, subcarrier spacing: 5.4857 kHz, the number chips of cyclic prefix plus window: 224, the number of chips of cyclic prefix: 208, and
   (4) N_FFT size: 1024, subcarrier spacing: 4.8 kHz, the number chips of cyclic prefix plus window: 96, the number of chips of cyclic prefix: 80.

4. The method of claim 3, wherein the system has clock rate 'x' MHz and the specific number of BCMCS data chips per symbol, N_FFT size, the number chips of cyclic prefix plus window, and the number of chips of cyclic prefix scale with a factor of x/4.9152.

5. A method of transmitting signals for providing broadcast and multicast service (BCMCS) in a wireless communications system, the method comprising:
   preparing a specific number of BCMCS symbols per frame at a specific clock rate, each of the specific number of BCMCS symbols comprising a specific number of BCMCS data chips preceded by a cyclic prefix having a specific length greater than or equal to an anticipated multi-path delay spread;
   performing space-time block coding (STBC) of the BCMCS data chips over two consecutive BCMCS symbols in a time domain per frame; and
   transmitting the BCMCS symbols using an open loop multi-input multi-output, (MIMO) technique,
   wherein the specific clock rate is 4.9152 MHz, the number of BCMCS symbols per frame is 6 and the specific number of BCMCS data chips per symbol is 746.667, and
   wherein N_FFT size, subcarrier spacing, the number chips of cyclic prefix plus window and the number of chips of cyclic prefix are configured according to one of:
   (1) N_FFT size: 384, subcarrier spacing: 12.8 kHz, the number chips of cyclic prefix plus window: 362.7, the number of chips of cyclic prefix: 346.7,
   (2) N_FFT size: 400, subcarrier spacing: 12.288 kHz, the number chips of cyclic prefix plus window: 346.7, the number of chips of cyclic prefix: 330.7,
   (3) N_FFT size: 480, subcarrier spacing: 10.24 kHz, the number chips of cyclic prefix plus window: 266.7, the number of chips of cyclic prefix: 250.7,
   (4) N_FFT size: 512, subcarrier spacing: 9.6 kHz, the number chips of cyclic prefix plus window: 234.7, the number of chips of cyclic prefix: 218.7,
   (5) N_FFT size: 796, subcarrier spacing: 8.5333 kHz, the number chips of cyclic prefix plus window: 170.7, the number of chips of cyclic prefix: 154.7, and
   (6) N_FFT size: 640, subcarrier spacing: 7.68 kHz, the number chips of cyclic prefix plus window: 106.7, the number of chips of cyclic prefix: 90.67.

6. The method of claim 5, wherein the system has clock rate 'x' MHz and the specific number of BCMCS data chips per symbol, N_FFT size, the number chips of cyclic prefix plus window, and the number of chips of cyclic prefix scale with a factor of x/4.9152.

7. A method of transmitting signals for providing broadcast and multicast service (BCMCS) in a wireless communications system, the method comprising:

preparing a specific number of BCMCS symbols per frame at a specific clock rate, each of the specific number of BCMCS symbols comprising a specific number of BCMCS data chips preceded by a cyclic prefix having a specific length greater than or equal to an anticipated multi-path delay spread;

performing space-time block coding (STBC) of the BCMCS data chips over two consecutive BCMCS symbols in a time domain per frame; and transmitting the BCMCS symbols using an open loop multi-input multi-output, (MIMO) technique, wherein the specific clock rate is 4.9152 MHz, the number of BCMCS symbols per frame is 8 and the specific number of BCMCS data chips per symbol is 560, and wherein N_FFT size, subcarrier spacing, the number chips of cyclic prefix plus window and the number of chips of cyclic prefix are configured according to one of:
  (1) N_FFT size: 320, subcarrier spacing: 15.36 kHz, the number chips of cyclic prefix plus window: 240, the number of chips of cyclic prefix: 224,
  (2) N_FFT size: 384, subcarrier spacing: 12.8 kHz, the number chips of cyclic prefix plus window: 176, the number of chips of cyclic prefix: 160, and
  (3) N_FFT size: 512, subcarrier spacing: 9.6 kHz, the number chips of cyclic prefix plus window: 48, the number of chips of cyclic prefix: 32.

8. The method of claim 7, wherein the system has clock rate 'x' MHz and the specific number of BCMCS data chips per symbol, N_FFT size, the number chips of cyclic prefix plus window, and the number of chips of cyclic prefix scale with a factor of x/4.9152.

* * * * *